Oct. 14, 1969  F. R. FEDER  3,472,491
APPARATUS SUITABLE FOR TREATMENT OF THERMOPLASTIC
MATERIAL TO IMPROVE FLOWABILITY THEREOF
Original Filed Nov. 15, 1965

INVENTOR
FRIEDHELM R. FEDER

ATTORNEY.

United States Patent Office 3,472,491
Patented Oct. 14, 1969

3,472,491
APPARATUS SUITABLE FOR TREATMENT OF THERMOPLASTIC MATERIAL TO IMPROVE FLOWABILITY THEREOF
Friedhelm R. Feder, Westfield, N.J., assignor to Wedco, Inc., Garwood, N.J., a corporation of New Jersey
Continuation of application Ser. No. 507,920, Nov. 15, 1965. This application Jan. 4, 1968, Ser. No. 695,808
Int. Cl. B01f 7/04; F16k 31/12
U.S. Cl. 259—9                                      5 Claims

ABSTRACT OF THE DISCLOSURE

Apparatus for working of thermoplastic material to improve flowability thereof comprising a drum having a stirrer disposed therein, an inlet at one end thereof and an outlet at the other end of the drum, means for rotating the stirrer, and control means for throttling the outlet in dependence on the temperature of the plastic.

---

This application is a continuation of application Serial No. 507,920, filed November 15, 1965, now abandoned, the latter application being a continuation-in-part of application Serial No. 373,792, filed June 9, 1964, now Patent No. 3,229,002.

The particular concern of the said patent is a process for the treatment of thermoplastic material to improve flowability thereof. The instant application is directed to the apparatus.

Figure 1:
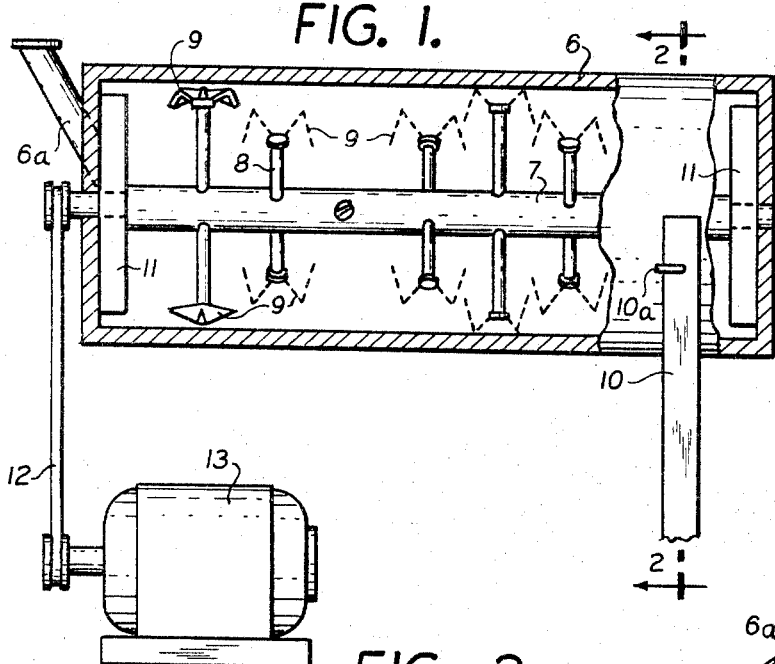
FIG. 1 is an elevation view in cross-section, depicting apparatus of the invention.

The apparatus of the invention includes a horizontally disposed drum having inlet means for introducing material into one end thereof, and outlet means for withdrawing material from the periphery of the drum adjacent the other end thereof. Stirrer means are positioned within the drum for stirring material in the vicinity of the drum periphery. Means are provided for rotating the stirrer means. Best results are obtained when the outlet means is at least 25° from the vertical. Also, it is significant to locate the inlet means so that it is spaced from the periphery of the drum, for center feeding of material to the drum.

Control means can be provided for controlling the rate of discharge of material from the drum so that, on the one hand, the residence time within the drum is long enough, and, on the other hand, the temperature within the drum does not become excessive. High temperature within the drum can result in agglomeration and caking up of the material, necessitating a shutdown and cleaning out of the drum. The control means can include means for throttling flow of material through the outlet, and means for sensing temperature of material in the drum together with control means operatively connected to the temperature sensing means and throttling means and effective to operate the throttling means in dependence on operation of the temperature sensing means.

Referring to the drawings, the apparatus includes a drum 6 having a horizontal axis. The stirrers are in the form of plow heads 9 (as shown, for example, in Patent No. 2,679,385) mounted on the cross bars 8, which, in turn, are mounted on the shaft 7. A plow head 9 is mounted on each end of each of the cross bars 8, such that it is spaced from the inside wall of the blender, a short distance such as ⅛ inch. The cross bars 8 are spaced axially along the vessel, and the axially extending dimensions of the plow heads 9 are such that there is a small overlap of the paths of adjacent plow heads. Further, the cross bars 8 are disposed in an angular relation with respect to each other so as to provide the cross bars in a uniform array within the blender. The inlet 6a to the blender is disposed at one end thereof while an outlet 10 is disposed at the other end thereof. The outlet is provided with a valve 10a in the form of a movable plate which can be positioned in the outlet to control flow of material therethrough. A motor drive 13 for the shaft 7 is connected to shaft 7 by the drive belt 12. At each end of the vessel, a scraper 11 is mounted on the shaft 7. The scrapers can be spaced about ⅛ inch from the ends of the vessel and serve to insure against any substantial accumulation of material as a cake on the ends of the blender.

Figure 2:
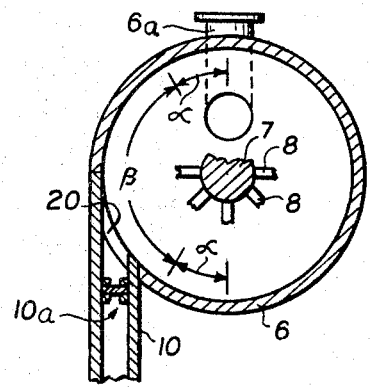
FIG. 2 is a cross-sectional view taken along line 2—2 in FIG. 1.

The outlet opening 10 is located at least 25° from the vertical, preferably at least 45°, or better at least 75°. Thus, the angles α in FIG. 2 are at least 25°, and the outlet 10 is located within the segment β, i.e., the entire opening of the outlet is within the segment β. Also, a valve 10a is preferably located adjacent the inlet end 20 of the outlet conduit 10.

The inlet to the drum 6 is located inwardly of the periphery of the drum, and preferably as close to the center of the drum as is possible. This construction is provided to permit center feeding to the drum, rather than feeding the drum at the periphery thereof. If desired, the inlet to the drum can include an annular opening about the shaft 7, rather than an opening as is shown in the drawing.

The operation of the apparatus of the invention is controlled by regulating the flow through the outlet 10. This regulation is effected with the valve 10a. The valve, in turn, is controlled by means, shortly to be described, for sensing the temperature of the material being treated. The valve can be a two position valve, wherein the open position is fixed, and the closed position is adjustable, so that for the closed position the valve is not necessarily fully closed. Then, a closed position can be selected such that when the valve is in the closed position flow of material will be a preselected amount. For the open position, the flow will of course be greater, and the control is then effected by fluctuation in the flow between the preselected amount corresponding to the closed position, and the flow corresponding to the open position.

Figure 2A:
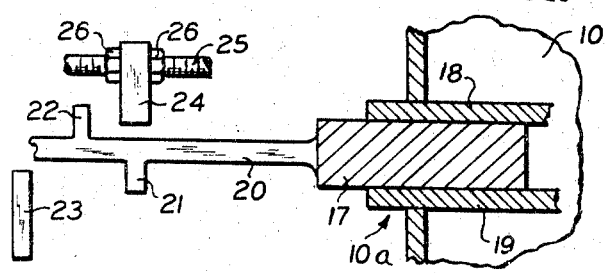
FIG. 2a is an enlarged view of a valve in the outlet of the apparatus.

Referring to FIG. 2a, the valve 10a is constructed with a gate plate 17 which is disposed between the guide plates 18 and 19. The gate plate is mounted on stem 20 which is provided with lug 21 and lug 22. A stop 23 is positioned in the path of the lug 21, as the stem 20 moves axially, to arrest the movement of the stem corresponding to opening of the valve. Thus, cooperation of the lug 21 and the stop 23 determine the fully open position of the valve. The closed position of the valve is determined by cooperation of lug 22 and stop 24. The stop 24 is adjustable. It is mounted on the threaded shaft 25, and can be selectively positioned along this shaft. Lock nuts 26 are provided for securing the stop 24 in a selected position. The valve is operated by control means shortly to be described.

A blender as is shown in FIG. 1 is 30" I.D. x 4 ft. long; has a 3" shaft with seven cross rods, each having a plow head at each end thereof; scrapers are provided as is indicated in the drawing; the outlet is a 4" x 4" square conduit communicating with the blender adjacent the end opposite the inlet, at about 9 o'clock, viewed from the outlet end, and for clockwise rotation of the shaft (viewed from the outlet end); the inlet can be a 4" x 4" square conduit. The drive is a 30 HP, 40 amp motor connected to the blender shaft to rotate the shaft at 500 r.p.m. The outlet can be connected to a pneumatic conveyor line (not shown) which serves to convey the material to a suitable collecting point. During passage from the vessel 6 to the collecting point, the material cools so that when collected, agglomeration does not occur.

Figure 3:
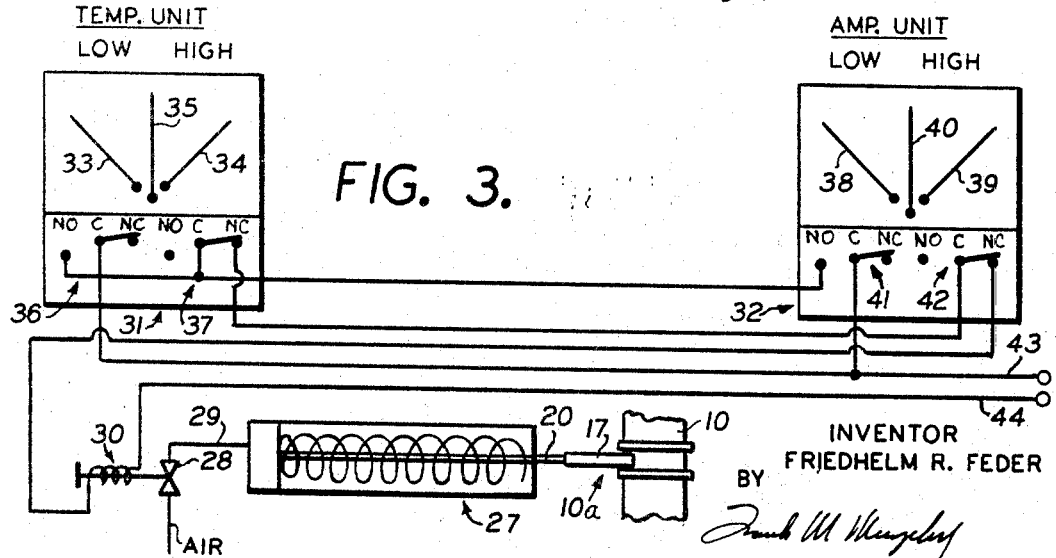
FIG. 3 is a schematic circuit diagram for a control system for the apparatus.

Means con controlling operation of the valve 10a are shown schematically in FIG. 3. A single-acting, spring-return air cylinder 27 holds the valve in the open position, unless activated by the opening of valve 28 in the air line 29. The valve 28 is controlled by solenoid 30. When the solenoid 30 is energized, the valve 28 is open, and the valve 10a is closed; and when the solenoid 30 is not energized, the valve 28 is closed, and the valve 10a is open.

While operation of the apparatus is based on the temperature of the material being treated, direct control of the valve 10a in dependence on temperature is not satisfactory because of the lag involved when such control is utilized. Accordingly, the temperature is sensed by direct measurement of temperature and also by measurement of the amperage of the motor 13.

Accordingly, the temperature sensing apparatus includes double set point temperature unit 31, and double set point ammeter unit 32. The temperature unit 31 includes selector needles 33 and 34 for selection, respectively, of low and high set points. Temperature response needle 35 is hooked up for movement in dependence on the temperature of material being treated (by means not shown), and makes contact with the selector needles or remains between the selector needles, depending upon the temperature sensed. Relays 36 and 37 are operatively connected (by means not shown), respectively, to the selector needles 33 and 34. The amp unit 32 is similar to the temperature unit, and includes the selector needles 38 and 39, amp response needle 40, and the relays 41 and 42 which are connected, respectively, with the needles 38 and 39. The amp response needle 40 moves between the selector needles 38 and 39 and makes contact with such needles or remains between them depending on the operation of the motor. In the showing for the relays 36, 37, 41, and 42, C indicates the center contact, NC indicates the normally closed contact, and NO indicates the normally open contact. Power is supplied by lines 43 and 44, and the temperature unit, amp unit, and solenoid are wired as is indicated in the drawing.

In operation, the control system will open the valve 10a for any of three conditions, namely: (1) when the temperature unit registers high temperature; (2) when the ampt unit registers high amperage (this will prevent motor overload); and (3) when both the temperature unit and the amp unit register a temperature within the range for which each has been set. For two operating conditions, the valve will close: (1) when one of the units registers low, while the other unit registers a condition within the range set; (2) when both units register low.

In the schematic showing in the drawing, the actuating cylinder 27 for the valve 10a is indicated as a spring actuator. Preefrably a double acting cylinder is used.

While the invention has been described in respect to particular embodiments thereof, these embodiments are merely representative and do not serve to define the limits of the invention.

What is claimed is:
1. Apparatus comprising:
   (a) a horizontally disposed drum;
   (b) inlet means for introducing material into one end of said drum;
   (c) outlet means for withdrawing material from the periphery of the drum adjacent the other end thereof;
   (d) stirrer means within the drum for stirring material introduced into the drum, throughout the vicinity of the drum periphery;
   (e) an electric motor for rotating the stirrer means; and
   (f) means for throttling flow of material through said outlet means, means for sensing temperature of material in the drum, and control means operatively connected to the temperature sensing means and the throttling means and effective to operate the throttling means in dependence on operation of the temtemperature sensing means,
   (g) said means for sensing temperature comprising:
      (1) means for directly measuring the temperature of the material being worked in the drum, and
      (2) means for measuring the amperage drawn by the motor;
   (h) said control means maintaining the valve open when the directly measured temperature is between a preselected relatively high value and a preselected relatively low value, and the amperage is between a preselected relatively high value and a preselected relatively low value, closing the valve when both the directly measured temperature and the amperage are below the relatively low values therefor, and when either the directly measured temperature or the amperage is below the relatively low value therefor while the other is between the relatively low value and the relatively high value therefor, and maintaining the valve open when the directly measured temperature or the amperage exceeds the relatively high value therefor.

2. Apparatus according to claim 1, said outlet means being at least about 25° from the vertical.

3. Apparatus according to claim 1, said inlet means being spaced from the periphery of the drum for center feeding of material to the drum.

4. Apparatus according to claim 1, said outlet means being at least about 75° from the vertical.

5. Apparatus according to claim 1, said outlet means being at least about 25° from the vertical, and said inlet means being spaced from the periphery of the drum for center feeding of material to the drum.

References Cited

UNITED STATES PATENTS 2,564,295   8/1951   Benz et al. _____ 251—129 XR

ROBERT W. JENKINS, Primary Examiner

JOHN M. BELL, Assistant Examiner

U.S. Cl. X.R.

259—45; 251—30